United States Patent
Higgins

(10) Patent No.: US 6,402,065 B1
(45) Date of Patent: Jun. 11, 2002

(54) METHOD AND APPARATUS FOR LYSING SLUDGE AND DIVIDING SOLIDS IN LIQUID SUSPENSION

(75) Inventor: John A. Higgins, Berwick, ME (US)

(73) Assignee: Kady International, Scarborough, ME (US)

( * ) Notice: Subject to any disclaimer, the term of this patent is extended or adjusted under 35 U.S.C. 154(b) by 0 days.

(21) Appl. No.: 09/446,567

(22) PCT Filed: Jun. 24, 1998

(86) PCT No.: PCT/US98/13086

§ 371 (c)(1),
(2), (4) Date: Dec. 22, 1999

(87) PCT Pub. No.: WO98/58740

PCT Pub. Date: Dec. 30, 1998

Related U.S. Application Data

(60) Provisional application No. 60/050,601, filed on Jun. 24, 1997.

(51) Int. Cl.[7] .............................................. B02C 18/40
(52) U.S. Cl. ................... 241/21; 241/46.06; 241/46.17; 241/185.6
(58) Field of Search ........................ 241/20, 21, 46.06, 241/46.17, 185.6, 258

(56) References Cited

U.S. PATENT DOCUMENTS

| 2,209,613 A | 7/1940 | Roeder |
| 3,620,371 A | 11/1971 | Valdespino |
| 3,652,406 A | 3/1972 | Westberg |
| 3,806,448 A | 4/1974 | Smith et al. |
| 4,053,394 A | 10/1977 | Fisk |
| 4,159,944 A | 7/1979 | Erickson et al. |
| 4,297,122 A | 10/1981 | Wallace |
| 4,341,632 A | 7/1982 | Gregor et al. |
| 4,342,650 A | 8/1982 | Erickson et al. |
| 4,347,004 A | 8/1982 | Platts |
| 4,813,617 A | 3/1989 | Knox, Jr. et al. |
| 4,985,149 A | 1/1991 | Ohshima et al. |
| 5,019,267 A | 5/1991 | Eberhard et al. |
| 5,045,202 A | 9/1991 | Stearns et al. |
| 5,240,599 A | 8/1993 | Kew et al. |
| 5,282,980 A | 2/1994 | Kew et al. |
| 5,370,999 A | 12/1994 | Stuart |
| 5,380,445 A | 1/1995 | Rivard et al. |
| 5,498,766 A | 3/1996 | Stuart et al. |
| 5,522,553 A | 6/1996 | LeClair et al. |
| 5,846,425 A | 12/1998 | Whiteman |

FOREIGN PATENT DOCUMENTS

| EP | 0293374 | 1/1992 |
| WO | 8704423 | 7/1987 |

OTHER PUBLICATIONS

Feasibility Study of Sludge Lysis and Recycle in the Activated Sludge Process, by A.M. Springer, G. Dietrich–Velazquez, and C. Higgy, 1993 Enivormental Conference pp 761–771.

Primary Examiner—Allen Ostrager
Assistant Examiner—William Hong
(74) Attorney, Agent, or Firm—Selitto, Behr & Kim

(57) ABSTRACT

Apparatus and system to mechanically lyse microbial cells and disintegrate particulate in liquid and recycling the lysed cells, cytoplasm and particulates to the aeration system of a wastewater treatment plant. The method of lysis is cavitation and impingement in a mill, which preferably has a plurality of stages, each with a rotor/stator set. A corresponding plurality of dividers within the mill channel the fluid sequentially through each of the plurality of stages. Orifice plates may be utilized to maximize cavitation by controlling flow into the rotors, which preferably have tapering slots to maximize cavitation.

43 Claims, 9 Drawing Sheets

METHOD AND APPARATUS FOR LYSING SLUDGE AND DIVIDING SOLIDS IN LIQUID SUSPENSION

This is a 371 of PCT/US 98/13066 filed Jun. 24, 1998 which claims benefit of 60/050,601 filed Jun. 24, 1997.

TECHNICAL FIELD OF THE INVENTION

The present invention relates to sewage treatment apparatus and methods and more particularly to lysing mills and systems for lysing biological sludges, biological floc and mixed liquor, and dewatering sludge. The present invention also relates to apparatus and methods for rupturing microbial cells (lysis) and separating the cellular membrane from the cytoplasm in the production of cell-free extracts, serum and nutriments from fermentations, cell cultures and tissue. Further, the present invention relates to apparatus and methods for disintegrating solid particles in the production of liposomes and submicron dispersions.

BACKGROUND ART

In recent years, the demand for more effective and efficient sewage treatment facilities has grown. One of the most important aspects of sewage treatment is the removal and disposal of biosolids. It has long been recognized that biological respiration and synthesis occurring in the aeration system of a secondary biological wastewater treatment plant converts the organic material it receives in the sewerage it treats to carbon dioxide. water and new cells. The amount of biodegradable organic material in the sewerage treated can be indirectly determined as biological oxygen demand (BOD). Much of this BOD (40 to 60%) is transformed into new cells as a result of the aerobic respiration occurring in the treatment plant's aeration system. These new cells (biosolids), which are produced daily, must be removed for the proper operation of the treatment plant. This waste stream is known as waste activated sludge. Merely separating and removing the biosolids translates to a substantial solid waste disposal problem, with a large portion of the mass of the biosolids being attributable to intracellular water. Accordingly, if the cell solids could be isolated and removed from the biomass leaving cellular water content to be returned to the processed wastewater, such separation would constitute a large reduction in the mass and volume of biosolids requiring disposal, e.g., in a landfill.

In the past, rotor and stator colloidal dispersion mills have been used for mechanically disintegrating suspended solid and liquid components of, e.g., wastewater sludge, paint, ink and the like to produce liquid suspensions with finely divided components. In U.S. Pat. No. 5,240,599, liquid containing immiscible liquid(s) and/or partially dispersed solid particulate component(s), are propelled by a rotor against the interior surface of a concentric stator ring having a plurality of radial passageways or slots intermittently spaced around its circumference. The slots have a constant, relatively narrow width compared to the circumference of the stator. The rotor is typically propelled at a very high velocity, e.g., usually between 5,000 to 12,000 feet per minute. As a result, the fluid and entrained immiscibles to be processed are subjected to strong centrifugal forces which induce an outward flow through the narrow slots of the stator. When the rotor and stator slots come into alignment, the fluid is ejected from the rotor slots into the stator slots. All components carried in the ejected fluid have an initial resultant velocity attributable to the radial and tangential velocity imparted by the rotor. Predominantly tangential motion causes some portion of the immiscibles carried in the flow through the rotor slot to impinge on the interior radial surface of the stator slot emanating from the trailing edge of the slot, fracturing them into smaller sub-parts. This action is applicable to particles or to globules of undissolved fluids which can be broken down by impinging them against the stator slot walls.

Workers in the field of cell disruption have shown that pressures on the order of 5,000 to 20,000 psia are necessary to rupture bacterial cell membranes. Traditional lysing processes rely on brute-force techniques to generate high-pressures. For example, hydraulic cylinders raise the pressure of a flow stream up to the required pressure of 5,000 to 20,000 psia. The liquid is then forced through an orifice, split into two streams which are brought back together, and made to impinge against one another. This technique is far more energy intensive then comparable lysing with a dispersion mill, which produces these high pressures for a brief instant with each impact.

U.S. Pat. No. 5,522,553 sought to improve the lysing capacity of a dispersion mill of the type with a slotted rotor and stator by changing the design of the slots in the stator. The '553 patent describes chamfers on the leading edges of the stator slots to permit fluid flow from the rotor into the stator which is of longer duration, of greater volume, and along a path resulting in a impact angle of 90°. The impact angle of 90° of U.S. Pat. No. 5,522,533 generates greater stagnation forces that result in cavitation when the fluid accelerates away from the impact zone. Subsequent discharges into the stator slot increase ambient pressure around vapor cavities created by prior fluid injections into the slot and accelerate cavity collapse. This generates higher pressures through accelerated collapse and also through reentrant jet effects. The tremendous pressures associated with cavitation and reentrant jet effects result in shock waves which are transmitted through the fluid and lead to a disintegration of entrained particulates, such as cells. While the prior art referred to above is highly effective in cell lysing, improvements are always desirable to increase the efficiency and effectiveness of cell lysing apparatus, which is an objective of the present invention.

It is a further object of the present invention to incorporate a cell lysing apparatus into a wastewater processing train to produce a more efficient wastewater processing system. Another objective of the invention's cellular disruption is the elimination of the occurrence of bulking arising from the production of excess filamentous organisms in an aerobic wastewater treatment system.

It is another objective of this invention to provide an efficient apparatus for microbial lysis and particle disintegration which is sufficiently small so as to be easily installed into existing wastewater treatment facilities with little or no modification of such facilities being required.

DISCLOSURE OF THE INVENTION

The present invention provides a novel means of operating an activated sludge wastewater treatment facility without the need to remove excess biological sludge. The present invention, through the induction of robust cavitation and impingement, ruptures the cells and fragments the particles in the waste activated sludge stream and recycles this processed/lysed material as food to the microorganisms that reside in the aeration system of the wastewater treatment plant. The recycling of the disintegrated waste activated sludge is not sufficient alone to eliminate the production of excess biosolids due to the composite metabolism of all the microorganisms residing in the wastewater treatment system. Therefore it is also part of the claimed invention that the continuous operation of the embodied apparatus generates conditions, where only specific species of microorganisms can exist and thrive. This method of operation artificially creates an endogenous phase of respiration, where the growth of cells does not cease, but where the rate, by which, microorganisms reproduce (biological respiration) is exceeded by the combination of natural cellular degradation and the rate of cellular disruption and lysis generated by the present invention. The invention's capacity to produce cellular disruption also eliminates bulking, which arises from the production of excess filamentous organisms in an aerobic wastewater treatment system. The present invention, while providing an efficient and effective means of microbial lysis and particle disintegration, is physically modest in size and suitable for installation into existing wastewater treatment facilities without substantial modification thereof.

BRIEF DESCRIPTION OF THE DRAWINGS

For a more complete understanding of the present invention, reference may be had to the following detailed description considered in conjunction with the accompanying drawings, in which.

BEST MODE FOR CARRYING OUT THE INVENTION

Figure 1:
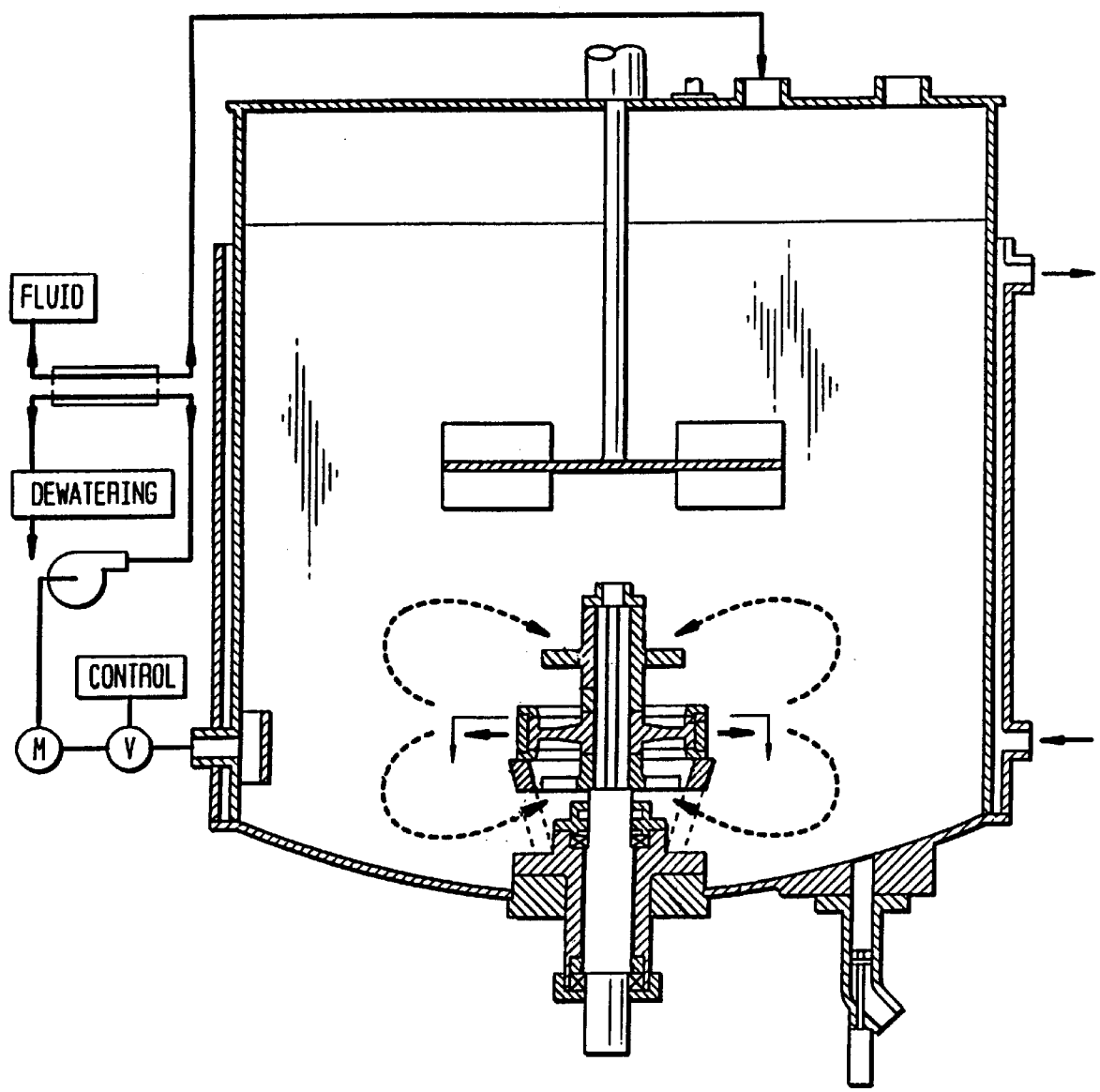
FIG. 1 is a partially schematic cross-sectional view of a dispersion mill in accordance with the prior art, more specifically as shown in FIG. 1 of U.S. Pat. No. 5,522,553.
Figure 2:
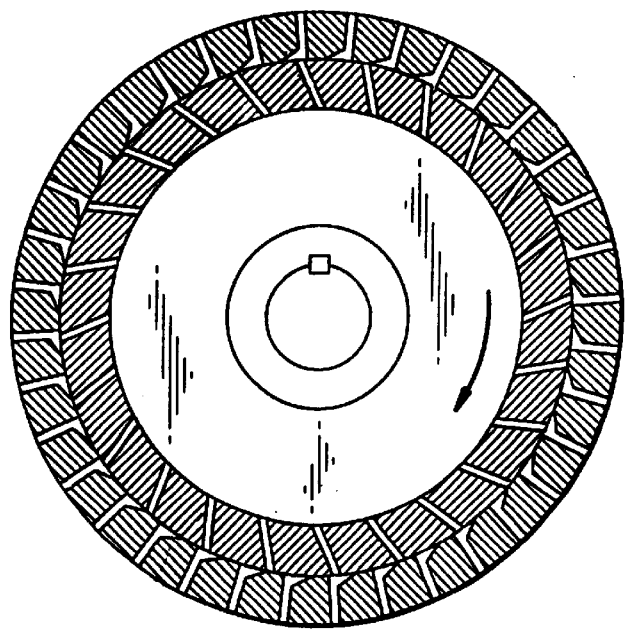
FIG. 2 is an enlarged, cross-sectional view of the prior art rotor and stator utilized in the dispersion mill of FIG. 1.

FIGS. 1 and 2 illustrate a prior art dispersion mill which can be utilized, inter alia, for treatment of sewage. The mill includes a tank having a rotor/stator assembly disposed in the bottom thereof. A shaft extends from the rotor inside the tank to the exterior where a source of rotary power is coupled to the shaft for rotating the rotor. In order to increase the occurrences of entrained particulates striking the surface of the stator as fluid is pumped through the stator, the slots in the stator shown in FIG. 2 are chamfered on the leading edge. The chamfer permits a greater volume of fluid to enter the stator slots and increases the number of 90° impacts against the stator slot. A 90° impact angle results in greater stagnation forces and cavitation, as well as giving rise to the reentrant jet effect which generates shock waves to disintegrate entrained particulates. The prior art device shown in FIGS. 1 and 2 is suitable for batch processing wherein a volume of fluid to be processed is introduced into the tank, processed, then drained from the tank.

Figure 3:
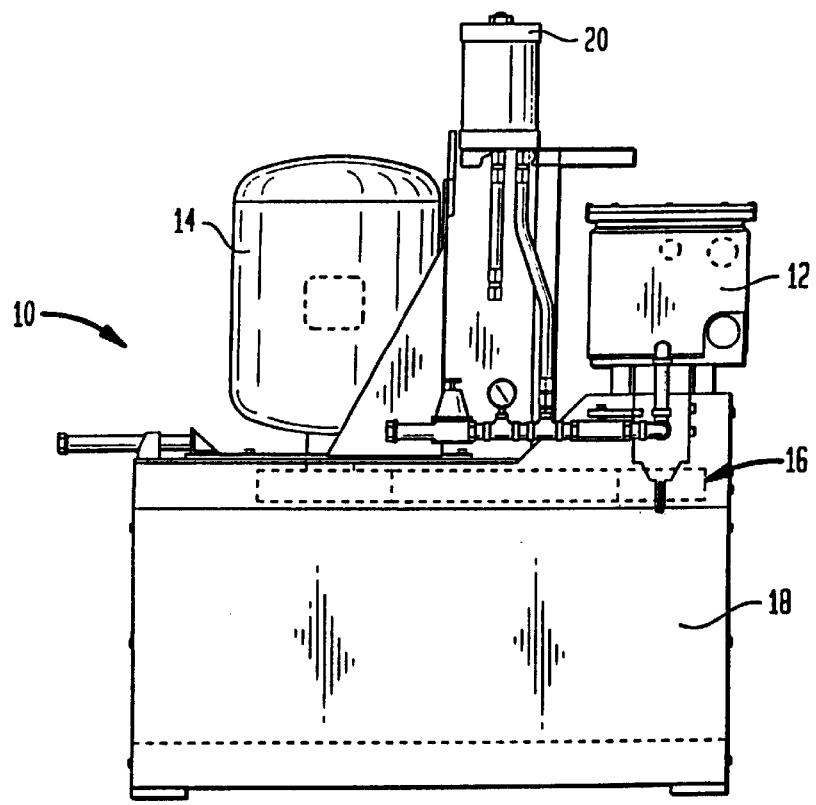
FIG. 3 is an elevational view of a lysing mill in accordance with the present invention.
Figure 4:
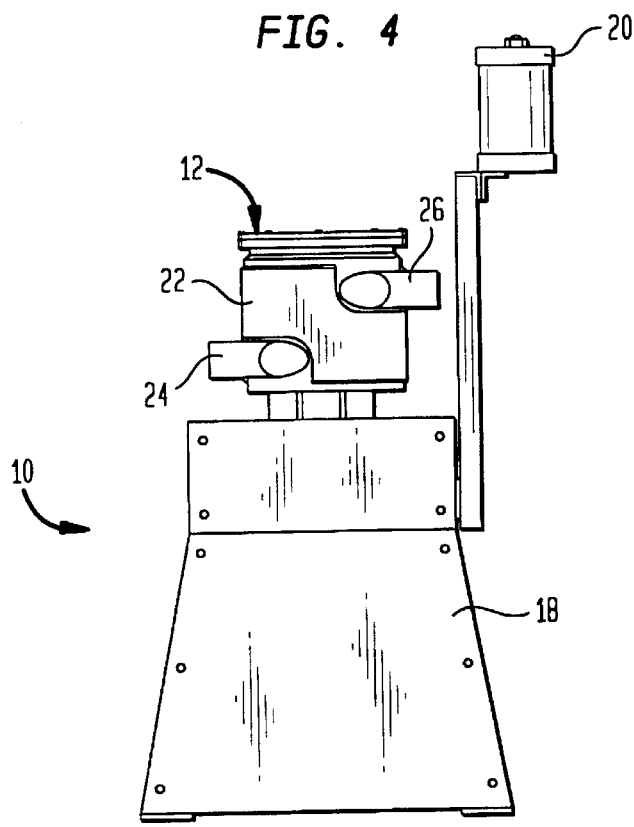
FIG. 4 is a side view of the lysing mill of FIG. 3.
Figure 5:
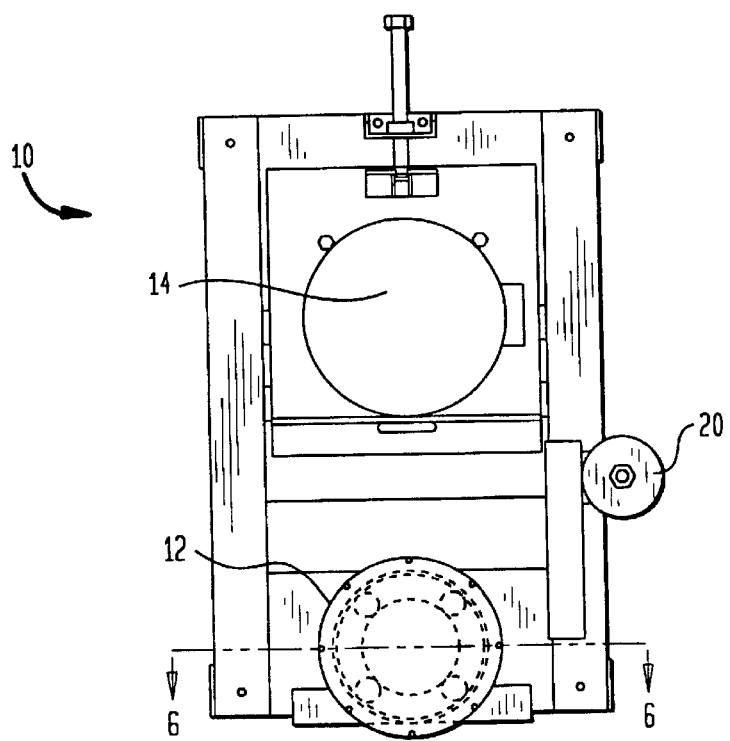
FIG. 5 is a top view of the lysing mill of FIGS. 3 and 4.

FIGS. 3, 4 and 5 show a lysing mill 10 in accordance with the present invention and having a tank 12 in which the process of particulate comminution occurs. The lysing mill 10 includes a motor 14 for driving the mill works within the lysing tank 12 via a transmission 16. The transmission can be any conventional power transmitting device such as a belt and pulleys, chain and sprockets, gears, etc. Typically, the lysing mill 10 will include a stand 18 for holding the mill components at a suitable height. Because the lysing mill 10 is driven at very high speeds, it is important to provide an uncontaminated supply of oil to the bearings. A lubrication system is therefore provided and preferably includes an oil filter 20. Tank 12 is preferably provided with a cooling jacket 22 to remove heat generated through operation of the mill. The lysing mill 10 of the present invention may be used as an in-line mill due to its high processing capacity and the efficiency/thoroughness of its two-stage processing as described below. The in-line functionality of the mill 10 is indicated by inlet 24 and outlet 26 on the lysing tank 12.

Figure 6:
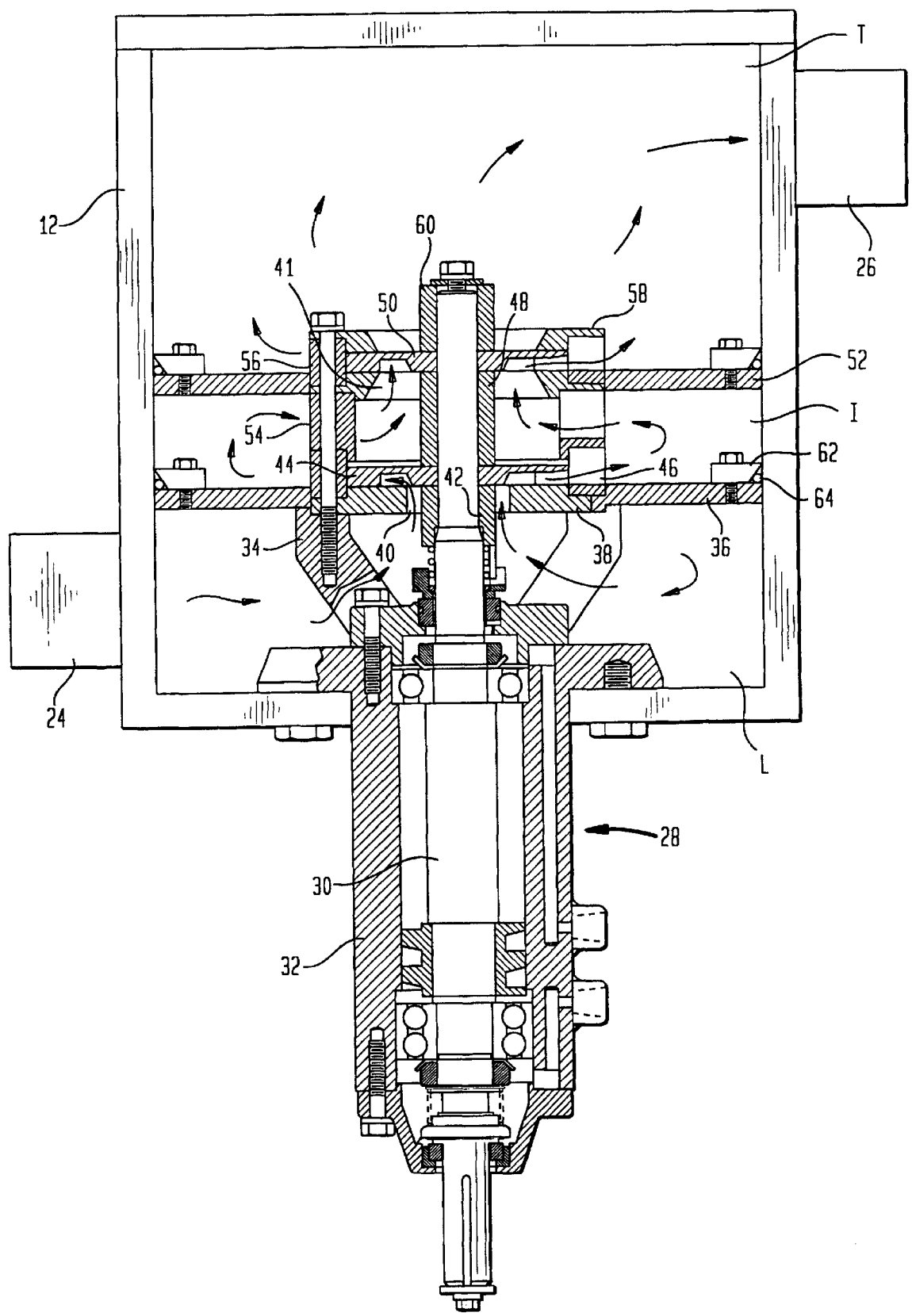
FIG. 6 is an enlarged cross-sectional view of the lysing mill shown in FIGS. 3–5 taken along section line VI—VI and looking in the direction of the arrows.

FIG. 6 illustrates a two-stage mill assembly 28 within tank 12. The bottom portion of the mill assembly 28 is inserted through an opening in the bottom of the tank 12 such that a shaft 30 thereof may be coupled to a suitable means for turning the mill, such as a pulley and belt, direct drive or other known mechanical transmission means for connecting a motor to a driven shaft. Shaft housing 32 accommodates roller or ball bearings and seals for supporting the shaft 30 securely and in a manner allowing the shaft to be rotated at very high speeds. The shaft housing 32 is bolted and sealed to the bottom of the tank 12 and receives a support spider 34 having a plurality of spaced arms that extend upwardly and receive at the upper ends thereof a bottom divider plate 36. The bottom divider plate 36 creates a lower chamber L within the tank 12 that receives the fluid inflow from inlet 24. The bottom divider plate 36 has an orifice therein for receiving an orifice/wear plate 38 which is essentially a flanged disk that rests upon a portion of the spider support arms coaxially with the bottom divider plate 36. The orifice/wear plate 38 has an axial bore 40 which, in cooperation with spacer 42, defines a fluid inlet to the first stage rotor 44. The rotor 44 is keyed to the shaft 30 and rotates conjointly therewith. The fluid entering the lower chamber of the tank 12 passes between the arms of the spider support 34 and its flow is restricted by bore 40 in the orifice/wear plate 38 before it enters the rotor 44. A first stage stator 46 is coaxially associated with the rotor 44 such that fluid propelled from the rotor 44 by centrifugal force passes through the stator 46 into an intermediate chamber I above the bottom divider plate 36. An intermediate spacer 48 spaces the first stage rotor 44 from the second stage rotor 50 which, like the first stage rotor 44, is keyed to the shaft 30 and turns in unison with the shaft and the first stage rotor. A top divider plate 52 completes the intermediate chamber and further divides the tank 12 into three separate chambers, the uppermost, T, being vented by outlet 26. The top divider plate 52 is mounted on a flow cage 54 that permits fluid to flow from the intermediate chamber through the flow cage and the top divider plate 52 into the second stage rotor 50. The top divider plate 52 supports the second stage stator 56 through which fluid is forced via the centrifugal action of the second stage rotor 50. As is evident from a comparison of the bottom divider plate 36 and the top divider plate 52 shown in FIG. 6, the orifice wear plate 38 is optional and can be omitted in lieu of a divider plate having a selected orifice. An independent orifice/wear plate 38 is desirable however, in that the plate can be replaced to reestablish tolerances after wear occurs, namely between the rotors 44, 50 and a corresponding orifice/wear plate 38. It should be appreciated that the orifice 40, 41 defined by an orifice/wear plate 38 or by a divider plate 36, 52 has an important effect on the operation of the lysing mill 10. More specifically, the orifice determines the rate of flow therethrough and the pressure differential between the inlet and outlet sides of each rotor. It should further be appreciated that each stage of the mill preferably has an optimized orifice 40 feeding the respective stage in the mill. This promotes efficiency in that each stage has its own optimal pressure differential across the respective rotors for producing maximum cavitation.

A cap plate 58 completes the two stage mill assembly 28 via bolts that are received within the spider support 34. A rotor spacer 60 permits a bolt threaded into the end of the shaft 30 to clamp the rotor assemblies onto the shaft 30 in their proper positions. The divider plates 36 and 52 are sealed against the walls of the tank 12 via seal rings 62 that bolt to the divider plates 36, 52 and urge cooperating, resilient O-rings 64 into sealing engagement with the walls of the tank 12.

Figure 7:
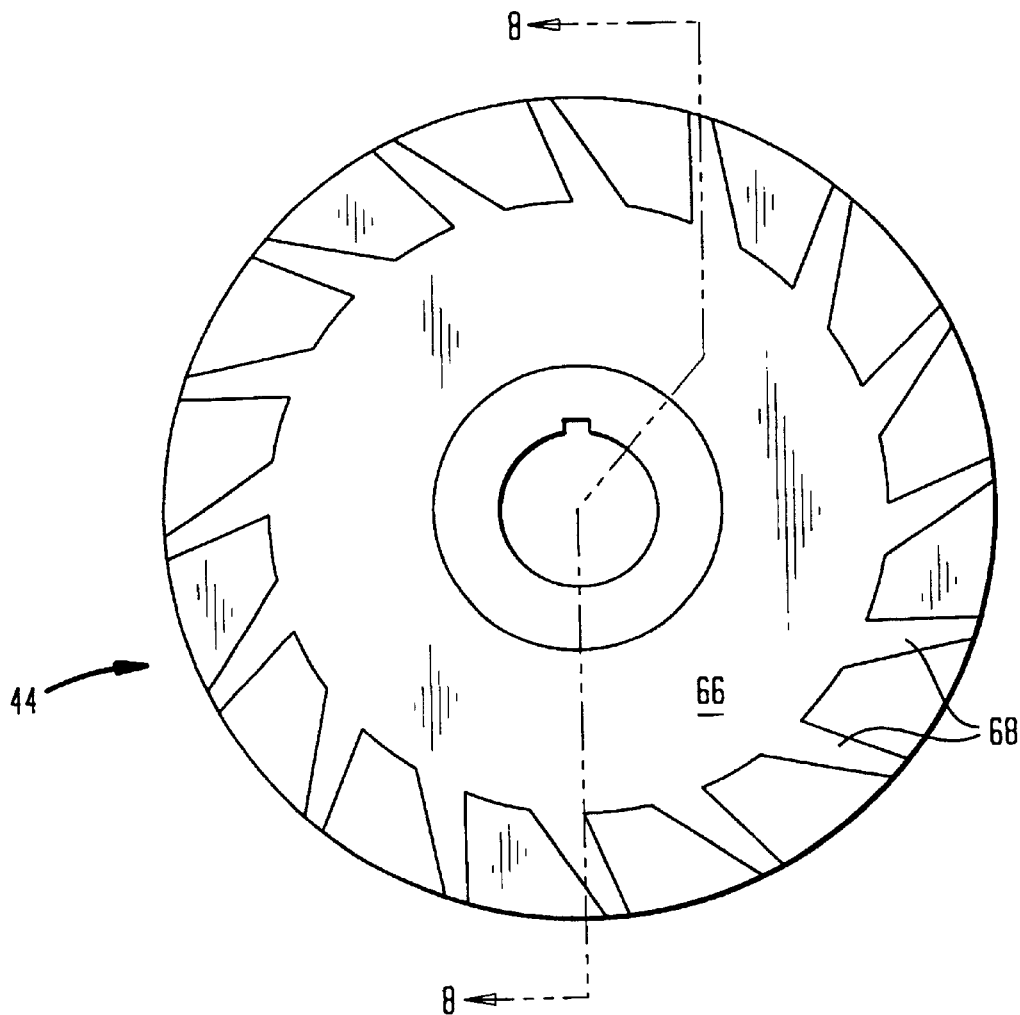
FIG. 7 is a plan view of a rotor from the lysing mill of FIG. 6.
Figure 8:
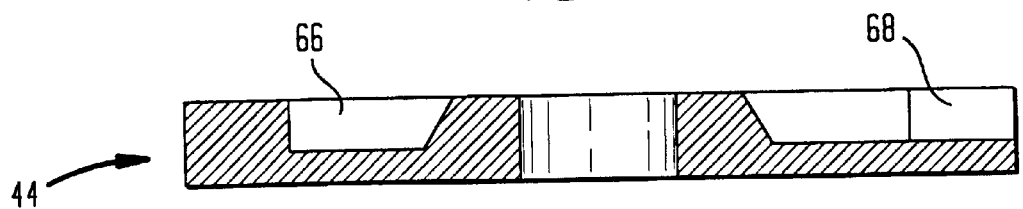
FIG. 8 is a cross-sectional view of the rotor of FIG. 7 taken along section line VIII—VIII and looking in the direction of the arrows.

FIGS. 7 and 8 illustrate the rotor 44 of the present invention in greater detail. A central depressed area 66 functions as an inlet area for fluid when the rotor is sealed against a wear plate 38 or one of the divider plates 36, 52. FIG. 7 illustrates a unique feature of the present invention, namely, tapered rotor slots 68 which are designed to enhance the cavitation effect within the lysis mill by increasing the pressure differential across the rotor/stator gap. As can be appreciated from FIG. 7, the rotor slots are comprised of a first slot wall in the range of approximately 23° from the radial position and a second wail approximately 34° from the radial. Cavitation enhancement is due to an increased fluid pressure at the tip of the tapered rotor slot relative to a straight rotor slot. Namely, when a given volume of fluid is passed through the rotor slot, as the rotor slot, converges, the pressure increases. The sudden release of fluid pressure at the end of the rotor slot as the fluid enters the chamfered stator slots results in an increase in the frequency of vapor cavity formation or cavitation, as well as the violent collapse of vapor cavities at the stator slot. The effects of vapor cavity formation are further enhanced by varying the diameter of the orifice/wear plate 38 in accordance with the cavitation index number desired. Namely, by lowering the suction head at the inside throat of the rotor slot, the frequency of vapor cavity formation will be increased. It has been determined that a suction head of approximately 3.5 to 7.5 pounds per square inch absolute pressure is preferable for obtaining maximum cavitation effects.

Robust cavitation can be induced more easily for liquid suspensions with varying concentrations of solids and/or low viscosities by increasing the differential area between the inside rotor slot opening and the opening at the outside rotor slot opening. That is, for liquid suspensions with solids concentrations of 1% (10,000 mg/L) to 4% (40,000 mg/L) a ratio of 2:1 between the area of the inside slot opening to the outside or tip is desired. Where the concentration of solids in liquid suspensions are greater than 4% (40,000 mg/L), a ratio of 1:1 between the area of the inside slot opening to the outside or tip is desired. When the concentration of solids in liquid suspensions are 0.5% (5,000 mg/L) to 1% (10.000 mg/L), a ratio of 4.1 between the area of the inside slot opening to the outside or tip is desired. When the concentration of solids in liquid suspensions are 0.01% (100 mg/L) to 0.5% (5,000 mg/L). a ratio of 8:1 between the area of the inside slot opening to the outside or tip is desired.

Figure 9:
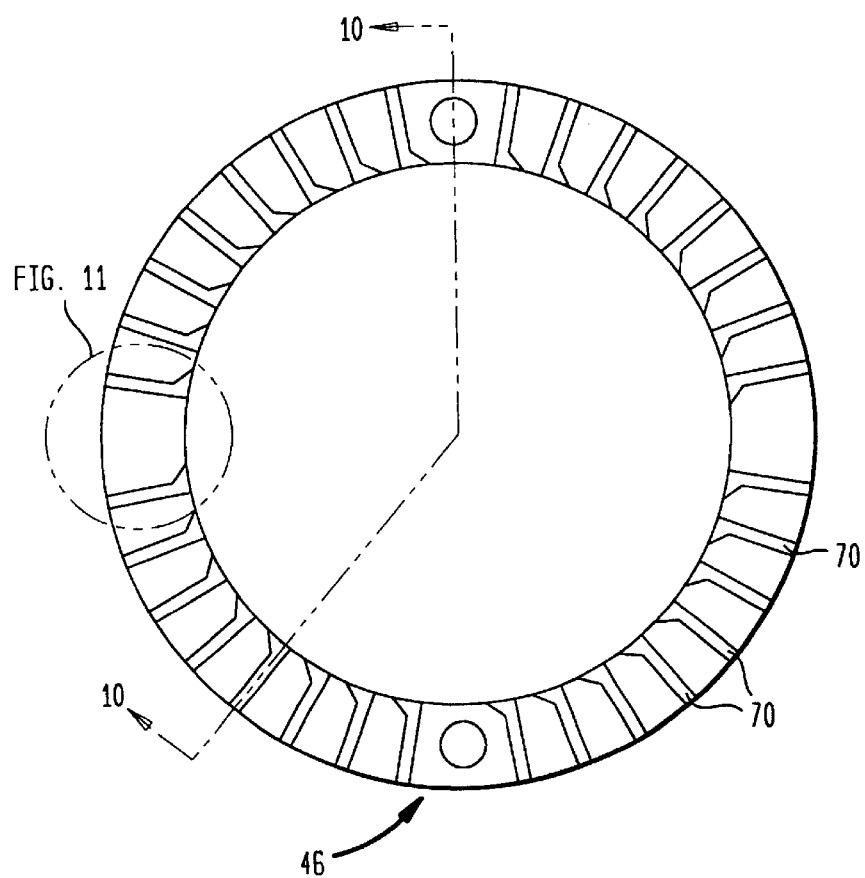
FIG. 9 is a plan view of a stator as would be utilized in the lysing mill of FIG. 6.
Figure 10:
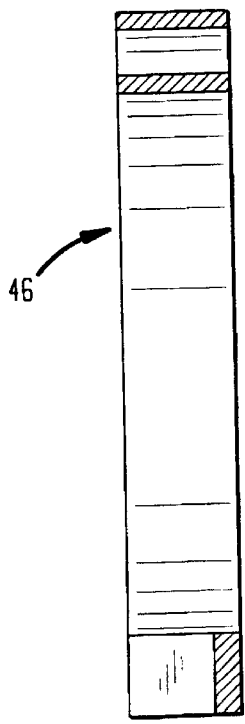
FIG. 10 is a cross-sectional view of the stator shown in FIG. 9 taken along section line X—X and looking in the direction of the arrows.
Figure 11:
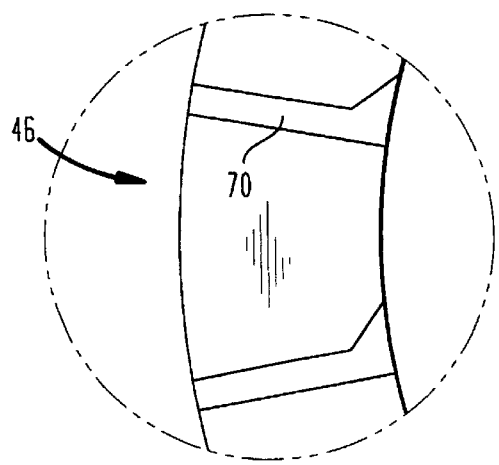
FIG. 11 is an enlarged fragmentary view of the rotor of FIG. 9 in the area identified as XI.

FIGS. 9, 10 and 11 show the configuration of the stators used in the lysing mill 10 of the present invention. More particularly, the stators utilize chamfered statored slots 70 as proposed in U.S. Pat. No. 5,522,553, a patent which has been assigned to the Assignee herein and which is incorporated herein by reference, for its teachings relative to the formation of rotors, stators and dispersion mills in general.

Figure 12:
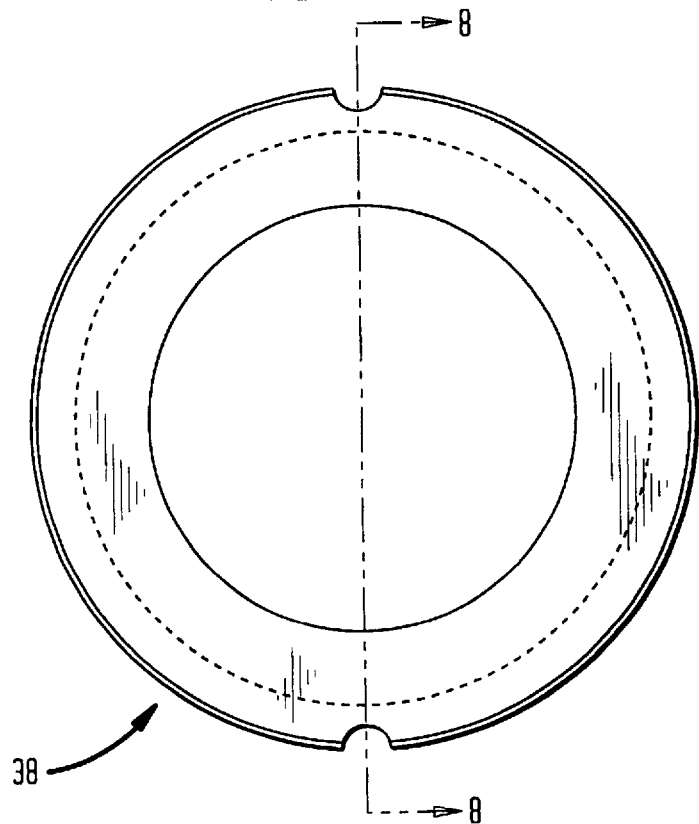
FIG. 12 is a plan view of a wear plate for incorporation in the lysing mill of FIG. 6.
Figure 13:
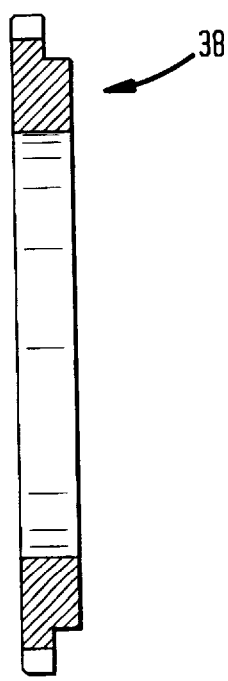
FIG. 13 is a cross-sectional view of the wear plate of FIG. 12 taken along section line XIII—XIII and looking in the direction of the arrows.

FIGS. 12 and 13 show in more detail the orifice/wear plate 38 of the present invention.

Figure 14:
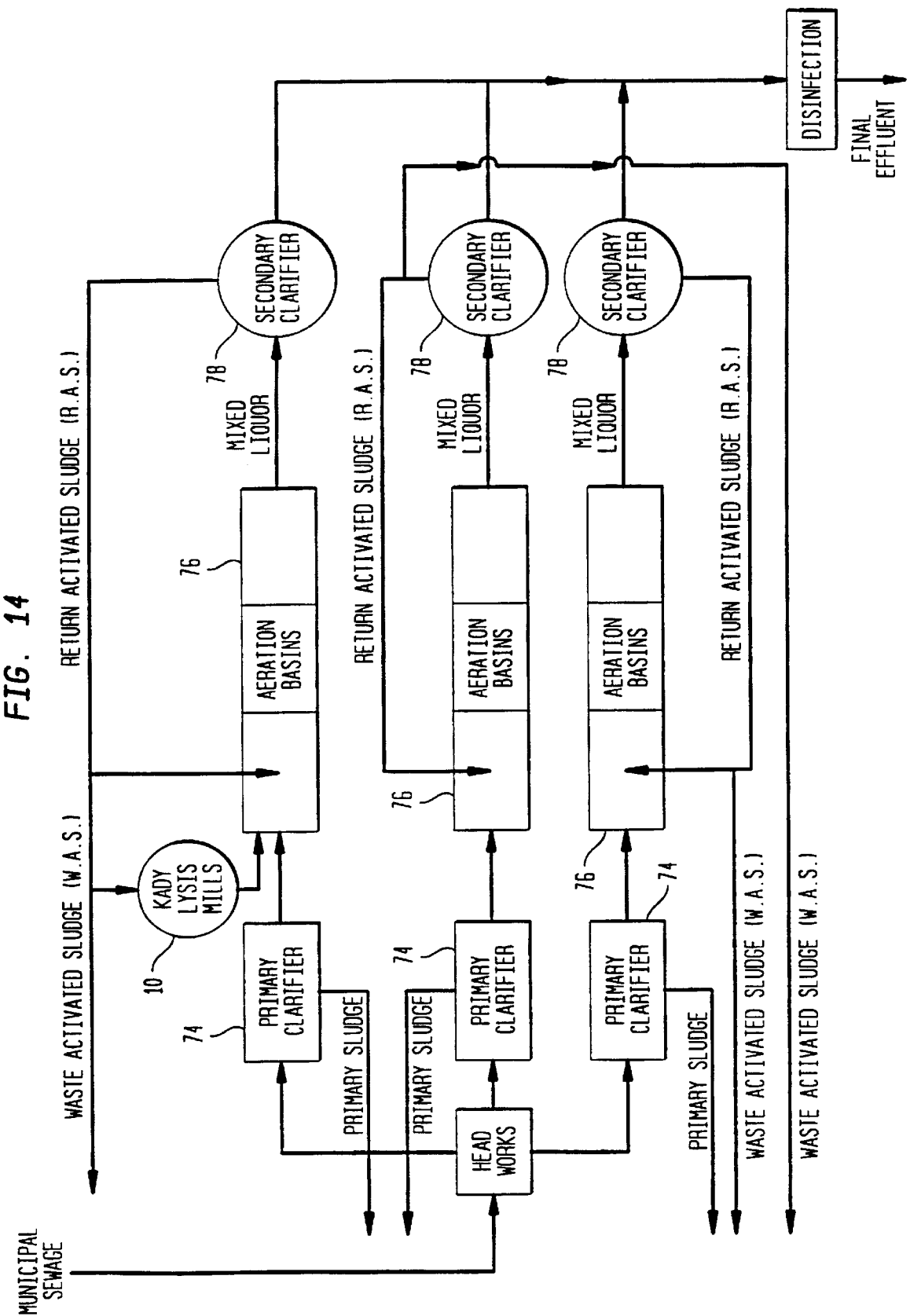
FIG. 14 is a schematic diagram of a wastewater treatment plant incorporating a lysing mill in accordance with the present invention.
Figure 15:
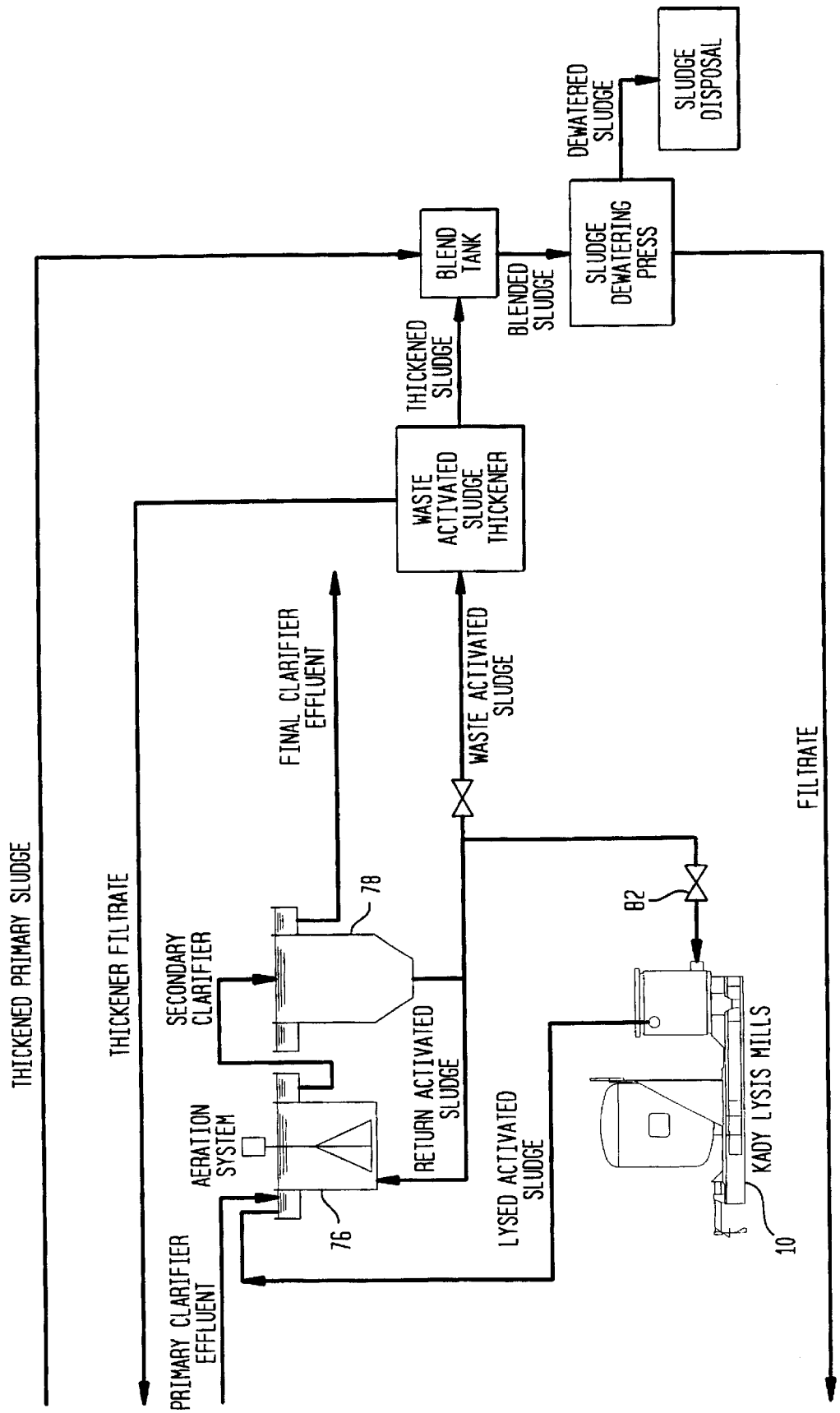
FIG. 15 is a more detailed schematic diagram of a portion of the wastewater treatment plant depicted in FIG. 14.

FIGS. 14 and 15 show the use of the present invention lysing mill within a wastewater treatment facility. The present invention can be employed in a conventional activated sludge treatment plant having one or more processing trains. In FIG. 14, the wastewater treatment facility includes a primary clarifier 74, aeration basin 76 and a secondary clarifier 78. Although, the diagram shows a primary clarifier/ settling tank as part of the treatment process, it is not an operational requirement of the present invention. As can be appreciated from FIG. 14, the lysing mill 10 of the present invention may be installed in the waste activated sludge line leading from the secondary clarifier 78. The present invention withdraws some or all of a selected portion of the waste activated sludge, processes it and outputs the processed/ lysed material to the aeration basin 76 thereby reintroducing the processed/lysed waste activated sludge as an additional food source for the microorganisms residing in the aeration system. Through microbial respiration, this processed/lysed sludge is converted to carbon dioxide, water and new cells. The introduction of the disintegrated waste activated sludge is not sufficient alone to eliminate the production of excess biosolids due to the composite metabolism of all the microorganisms residing in the wastewater treatment system. However, through the continuous operation of the present invention, conditions are generated whereby only a certain subset of species of microorganisms can exist and thrive. These species exist in an endogenous phase of respiration artificially created by the present invention, where the growth of cells does not cease, but where biological respiration is exceeded by the combination of natural cellular degradation and the cellular disruption generated by the present invention.

In the present invention, the intense localized pressure and temperature generated by the repeated collapse of vapor cavities at the stator from cavitation oxidizes a portion of the solubilized cytoplasm and disintegrated particulate to form carbon dioxide ($CO_2$), sulfur dioxide ($SO_2$), and nitrate ($NO_3$) compounds. The portion of carbonaceous material so oxidized no longer represents a demand on the aeration system of an activated sludge wastewater treatment plant in that such oxidized compounds are not readily utilized by microbes as nutrients. Yet another beneficial aspect of the present invention resides in its capacity to eliminate odiferous compounds from the processed waste stream. More specifically, hydrogen sulfide, a common, foul smelling compound present in sewage is converted to a non-odiferous bisulfate by exposure to a wastewater treatment train configured in accordance with the present invention.

A variable flow control valve 82 is desirable for regulating the inlet fluid pressure/volume to the lysing mill. The valve 82 permits adjustments to be made to achieve maximum cavitation effects by adjusting the differential input/output pressures. It should also be appreciated that the duty cycle of the lysing mill should be adjusted to meet the loading of the wastewater treatment facility. For example, in periods of peak usage of a regional sewage system, the duty cycle can be increased to meet the demand of the loading of the wastewater treatment facility.

While the present invention has been described as relating to an apparatus and method for lysing biological sludges, biological floc and mixed liquor, and dewatering sludge, it can also be used to rupture microbial cells (lysis) to separate the cellular membrane from the cytoplasm in the production of cell-free extracts, serum and nutriments from fermentations. cell cultures and tissue. Further, the present invention can also be used for disintegrating solid particles in the production of liposomes and submicron dispersions for injectable pharmaceuticals or other pharmacological, medicinal and therapeutic substances.

I claim:

1. A dispersion mill, comprising an annular rotor with a first series of slots therein, each slot of said first series of slots having a first slot wall and a second slot wall, said first slot wall and said second slot wall of a plurality of said first series of slots converging toward one another in a radially outward direction; and an annular stator with a second series of slots therein, each slot of said second series of slots intermittently aligning with each slot of said first series of slots as said rotor is rotated relative to said stator to thereby discharge flowable matter from said rotor into said stator when said rotor is rotated.

2. The dispersion mill of claim 1, wherein said first slot wall of each of said plurality of said first series of slots diverges from a radial orientation by about 23 degrees and wherein said second slot wall of each of said plurality of said first series of slots diverges from a radial orientation by about 34 degrees.

3. The dispersion mill of claim 1, wherein said second series of slots includes a plurality of chamfered slots, each of which is chamfered at a leading edge thereof.

4. The dispersion mill of claim 1, wherein said rotor has a central axially-extending opening, an inner circumferential surface delimiting said opening, and an outer circumferential surface delimiting a periphery of said rotor, said first series of slots extending generally radially through said rotor from said inner circumferential surface thereof to said outer circumferential surface thereof.

5. The dispersion mill of claim 4, wherein each slot of said first series of slots is sized and shaped so as to discharge a corresponding stream of flowable matter in a generally radial direction relative to a longitudinal axis of said rotor upon the rotation of said rotor about said longitudinal axis.

6. Apparatus for producing liquid suspensions of finely divided matter, comprising a housing accommodating flowable matter, said housing having an input opening for admitting flowable matter to be processed and an output opening for discharging processed flowable matter; a two-stage mill disposed within said housing, said mill including a rotable drive shaft extending through said housing, a first stage with a first annular rotor, which is mounted on said drive shaft and which has a first series of slots therein, and a first annular stator, which has a second series of slots therein and which cooperates with said first rotor to process flowable matter, and a second stage having a second annular rotor, which is mounted on said drive shaft and which has a third series of slots therein, and a second annular stator, which has a fourth series of slots therein and which cooperates with said second rotor to process flowable matter, each slot of said first series of slots intermittently aligning with each slot of said second series of slots to discharge flowable matter from said first rotor into said first stator, and each slot of said third series of slots intermittently aligning with each slot of said fourth series of slots to discharge flowable matter from said second rotor into said second stator; and controlling means disposed within said housing for controlling the flow of flowable matter such that it passes through said first stage and then through said second stage.

7. The apparatus of claim 6, wherein said first rotor and said second rotor each have a central axially-extending opening, an inner circumferential surface delimiting said opening, and an outer circumferential surface delimiting a periphery thereof, said first series of slots extending generally radially through said first rotor from said inner circumferential surface thereof to said outer circumferential surface thereof, said third series of slots extending generally radially through said second rotor from said inner circumferential surface thereof to said outer circumferential surface thereof.

8. The apparatus of claim 7, wherein each slot of said first series of slots and said third series of slots is sized and shaped so as to discharge a corresponding stream of flowable matter in a generally radial direction relative to a longitudinal axis of said first and second rotors, respectively, upon the rotation of said first and second rotors about their respective longitudinal axis.

9. The apparatus of claim 6, wherein said controlling means includes at least one divider member.

10. The apparatus of claim 9, wherein said at least one divider member includes a first divider member disposed between said inlet opening and said first stage, said first divider member having a first orifice therein through which flowable matter passes to enter said first series of slots provided in said first rotor of said first stage.

11. The apparatus of claim 10, wherein said at least one divider member includes a second divider member disposed between said first stage and said second stage, said second divider member having a second orifice therein through which said flowable matter passes to enter said third series of slots provided in said second rotor of said second stage.

12. The apparatus of claim 11, wherein said controlling means includes a flow cage interposed between said first stator of said first stage and said second divider member, said flow cage permitting flowable matter exiting said first stator of said first stage to flow through said flow cage and enter said second orifice provided in said second divider member.

13. The apparatus of claim 12, wherein said drive shaft passes through said first and second orifices of said first and second divider members, respectively.

14. The apparatus of claim 13, wherein said housing is substantially cylindrical, said first and second divider members being substantially disc-shaped and sealingly received within said housing.

15. The apparatus of claim 14, wherein said housing has an interior surface, each of said first and second divider members forming a seal with said interior surface of said housing.

16. The apparatus of claim 15, further comprising a support spider mounted in said housing, said support spider having a plurality of spaced arms through which flowable matter may pass, said spaced arms supporting at one end thereof said first divider member, said first stator of said first stage being supported upon said first divider member, said flow cage being supported upon said stator of said first stage, said second divider member being supported upon said flow cage, and said second stator of said second stage being supported upon said second divider member.

17. The apparatus of claim 14, wherein said first divider member includes a first inner member in which said first orifice is formed and a first outer member in which said first inner member is inserted to define said first divider member.

18. The apparatus of claim 17, wherein said first inner member is disc-shaped and said first orifice is substantially circular and proximate a center of said first inner member.

19. The apparatus of claim 18, wherein said first outer member is disc-shaped with a central aperture therein accommodating said first inner member, whereby said first inner member is separately replaceable relative to said first outer member.

20. The apparatus of claim 19, wherein said second divider member includes a second inner member in which said second orifice is formed and a second outer member in which said second inner member is inserted to define said second divider member.

21. The apparatus of claim 20, wherein said first inner member is proximate and substantially parallel to a lower surface of said first rotor.

22. The apparatus of claim 10, wherein the size of said first orifice in said first divider member is selected to provide maximum cavitation effects within said first stage of said mill.

23. The apparatus of claim 11, wherein the size of said second orifice in said second divider member is selected to provide maximum cavitation effects within said second stage of said mill.

24. A dispersion mill, comprising an annular rotor having a first series of slots therein, each slot of said first series of slots having an inner slot opening with an associated area and an outer slot opening with an associated area, the cumulative area of said inner slot openings exceeding the cumulative area of said outer slot openings; and an annular stator with a second series of slots therein, each slot of said second series of slots intermittently aligning with each slot of said first series of slots as said rotor rotates relative to said stator to thereby discharge flowable matter from said rotor into said stator when said rotor is rotated.

25. The dispersion mill of claim 24, wherein said rotor has a central axially-extending opening, an inner circumferential surface delimiting said opening, and an outer circumferential surface delimiting a periphery of said rotor, said first series of slots extending generally radially through said rotor from said inner circumferential surface thereof to said outer circumferential surface thereof.

26. The dispersion mill of claim 25, wherein each slot of said first series of slots is sized and shaped so as to discharge a corresponding stream of flowable matter in a generally radial direction relative to a longitudinal axis of said rotor upon the rotation of said rotor about said longitudinal axis.

27. The dispersion mill of claim 24, wherein the ratio of the cumulative area of said inner slot openings to the cumulative area of said outer slot openings Is selected to maximize the cavitation effect in said mill based upon the solids concentration of flowable matter.

28. The dispersion mill of claim 27, wherein said ratio is about 2.1 for flowable matter with solids concentrations of about 1%.

29. The dispersion mill of claim 27, wherein said ratio is about 1:1 for flowable matter with solids concentrations greater than about 4%.

30. The dispersion mill of claim 27, wherein said ratio is about 8:1 for flowable matter with solids concentrations from about 0.01% to about 0.5%.

31. A method for dewatering a sludge stream, comprising the steps of:

continuously directing at least a portion of said stream to a dispersion mill of the type having an annular rotor with a first series of slots therein, each slot of said first series of slots having a first slot wall and a second slot wall, said first slot wall and said second slot wall of a plurality of said first series of slots converging toward one another in a radially outward direction, and an annular stator with a second series of slots therein, each slot of said second series of slots intermittently aligning with each slot of said first series of slots as said rotor is rotated relative to said stator to thereby discharge said slurry from said rotor into said stator when said rotor is rotated;

lysing solids in said portion in said dispersion mill to thereby generate nutrients for cellular respiration; and reintroducing said portion passing through said mill to said stream, whereby nutrients generated by said lysing step support cellular respiration in said stream after reintroduction.

32. The method of claim 31, wherein said steps of lysing and reintroducing cause a reduction in cell population present in said stream greater than the increase in cell population attributable to the generation of nutrients attributable to said lysing.

33. The method of claim 31, wherein said step of lysing is a two step process including introducing said portion into a first stage of said mill, processing said portion in said first stage, said portion exiting said first stage after being processed therein and entering a second stage of said mill, and processing said portion in said second stage prior to said step of reintroducing said portion to said stream.

34. The method of claim 31, wherein said steps of lysing and reintroducing favor the reproduction of selected microorganisms present in said stream, whereby the percentage of said favored microorganisms relative to other microorganisms present in said stream exceeds that percentage prevalent in an unprocessed stream.

35. The method of claim 31, wherein said step of lysing creates an elevation in temperature and pressure of said portion in said mill leading to an increased rate of oxidation of said portion and oxidation of cytoplasm of lysed cells present within said portion.

36. The method of claim 35, wherein said elevation in temperature and pressure results in the conversion of odorous hydrogen sulfide to less odorous sulfates.

37. The method of claim 31, further including the step of varying the duty cycle of said mill to meet the varying quantity of said solids in said stream, with larger amounts of solids giving rise to increased duty cycles and smaller amounts of solids giving rise to decreased duty cycles.

38. The method of claim 31, wherein said portion of said stream is subjected to clarification in a primary clarifier, aeration in an aeration basin and clarification in a secondary clarifier prior to being processed in said mill and wherein said portion is returned to said aeration basin after being processed in said mill.

39. The method of claim 31, wherein said steps of lysing and reintroducing establish an endogenous phase of respiration of microorganisms present in said portion.

40. A method for the production of extracts, comprising the steps of:
- preparing a fluid slurry of a raw material containing a material to be extracted therefrom;
- directing at least a portion of said slurry to a dispersion mill of the type having an annular rotor with a first series of slots therein, each slot of said first series of slots having a first slot wall and a second slot wall, said first slot wall and said second slot wall of a plurality of said first series of slots converging toward one another in a radially outward direction, and an annular stator with a second series of slots therein, each slot of said second series of slots intermittently aligning with each slot of said first series of slots as said rotor is rotated relative to said stator to thereby discharge said slurry from said rotor into said stator when said rotor is rotated;
- lysing solids in said portion in said dispersion mill to thereby yield finely comminuted solids within said slurry; and
- extracting said material to be extracted from said slurry of finely comminuted solids.

41. A method for the production of extracts, comprising the steps of:
- preparing a fluid slurry of a raw material containing a material to be extracted therefrom;
- directing at least a portion of said slurry to an apparatus having a housing accommodating said portion said housing having an input opening for admitting said portion to be processed and an output opening for discharging processed slurry, a two-stage mill disposed within said housing, said mill including a rotable drive shaft extending through said housing, a first stage with a first annular rotor, which is mounted on said drive shaft and which has a first series of slots therein, and a first annular stator, which has a second series of slots therein and which cooperates with said first rotor to process said slurry, and a second stage having a second annular rotor, which is mounted on said drive shaft and which has a third series of slots therein, and a second annular stator, which has a fourth series of slots therein and which cooperates with said second rotor to process said slurry, each slot of said first series of slot intermittently aligning with each slot of said second series of slots to discharge said slurry from said first rotor into said first stator, and each slot of said third series of slots intermittently aligning with each slot of said fourth series of slots to discharge said slurry from said second rotor into said second stator; and controlling means disposed within said housing for controlling the flow of said slurry such that it passes through said first stage and then through said second stage.
- lysing solids in said portion in said apparatus to thereby yield finely comminuted solids within said slurry; and
- extracting said material to be extracted from said slurry of finely comminuted solids.

42. The method of claim 41, wherein said solids include cells and said material to be extracted is cellular matter.

43. A method for the production of extracts, comprising the steps of:
- preparing a fluid slurry of a raw material containing a material to be extracted therefrom;
- directing at least a portion of said slurry to a dispersion mill of the type having an annular rotor having a first series of slots therein, each slot of said first series of slots having an inner slot opening with an associated area and an outer slot opening with an associated area, the cumulative area of said inner slot openings exceeding the cumulative area of said outer slot openings, and an annular stator with a second series of slots therein, each slot of said second series of slots intermittently aligning with each slot of said first series of slots as said rotor rotates relative to said stator to thereby discharge said slurry from said rotor into said stator when said rotor is rotated;
- lysing solids in said portion in said dispersion mill to thereby yield finely comminuted solids within said slurry; and
- extracting said material to be extracted from said slurry of finely comminuted solids.

* * * * *

UNITED STATES PATENT AND TRADEMARK OFFICE
CERTIFICATE OF CORRECTION

PATENT NO.    : 6,402,065 B1
DATED         : June 11, 2002
INVENTOR(S)   : John A. Higgins It is certified that error appears in the above-identified patent and that said Letters Patent is hereby corrected as shown below:

<u>Column 1,</u>
Line 30, after "dioxide", delete "." and insert -- "," --.

Signed and Sealed this

Nineteenth Day of August, 2003

JAMES E. ROGAN
*Director of the United States Patent and Trademark Office*